(12) United States Patent
Jogo et al.

(10) Patent No.: US 10,287,432 B2
(45) Date of Patent: *May 14, 2019

(54) THERMOPLASTIC ELASTOMER COMPOSITION AND MOLDED ARTICLE

(71) Applicant: KURARAY CO., LTD., Kurashiki-shi (JP)

(72) Inventors: Yosuke Jogo, Kamisu (JP); Masaki Ikuji, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/505,791

(22) PCT Filed: Aug. 28, 2015

(86) PCT No.: PCT/JP2015/074545
§ 371 (c)(1),
(2) Date: Feb. 22, 2017

(87) PCT Pub. No.: WO2016/031991
PCT Pub. Date: Mar. 3, 2016

(65) Prior Publication Data
US 2017/0275451 A1   Sep. 28, 2017

(30) Foreign Application Priority Data

Aug. 29, 2014  (JP) ................ 2014-175794

(51) Int. Cl.
| | | |
|---|---|---|
| C08L 53/02 | (2006.01) | |
| C08J 3/24 | (2006.01) | |
| C08K 5/01 | (2006.01) | |
| C08K 5/103 | (2006.01) | |
| C08K 5/14 | (2006.01) | |
| C08F 297/04 | (2006.01) | |
| C08L 19/00 | (2006.01) | |
| C08L 25/06 | (2006.01) | |
| C08L 75/06 | (2006.01) | |
| C08F 255/02 | (2006.01) | |
| C08F 287/00 | (2006.01) | |
| C08F 291/00 | (2006.01) | |
| C08L 91/00 | (2006.01) | |

(52) U.S. Cl.
CPC .......... C08L 53/025 (2013.01); C08F 255/02 (2013.01); C08F 287/00 (2013.01); C08F 291/00 (2013.01); C08F 297/04 (2013.01); C08J 3/24 (2013.01); C08K 5/01 (2013.01); C08K 5/103 (2013.01); C08K 5/14 (2013.01); C08L 19/006 (2013.01); C08L 25/06 (2013.01); C08L 53/02 (2013.01); C08L 75/06 (2013.01); C08L 91/00 (2013.01)

(58) Field of Classification Search
CPC ...... C08L 53/025; C08L 19/006; C08L 75/06; C08L 25/06; C08F 297/04; C08J 3/24
See application file for complete search history.

(56) References Cited

U.S. PATENT DOCUMENTS

| | | | |
|---|---|---|---|
| 2004/0132907 A1 | 7/2004 | Nakamura et al. | |
| 2005/0256264 A1 | 11/2005 | Suzuki et al. | |
| 2017/0275440 A1* | 9/2017 | Jogo et al. ................ | C08L 9/06 |

FOREIGN PATENT DOCUMENTS

| | | |
|---|---|---|
| JP | 2003-20383 A | 1/2003 |
| JP | 2003-277575 A | 10/2003 |
| JP | 2004-136594 A | 5/2004 |
| JP | 2004-162049 A | 6/2004 |
| JP | 2005-89656 A | 4/2005 |
| JP | 2005-187536 A | 7/2005 |
| JP | 2006-335901 A | 12/2006 |
| JP | 3946080 B2 | 7/2007 |
| JP | 2008-248148 A | 10/2008 |
| JP | 2010-159363 A | 7/2010 |
| JP | 5065174 B2 | 11/2012 |
| WO | WO-0077118 A1 * | 12/2000 .......... C09J 153/025 |

OTHER PUBLICATIONS

International Search Report dated Nov. 17, 2015 in PCT/JP15/074545 Filed Aug. 28, 2015.

* cited by examiner

Primary Examiner — Nathan M Nutter
(74) Attorney, Agent, or Firm — Oblon, McClelland, Maier & Neustadt, L.L.P.

(57) ABSTRACT

Provided are: a thermoplastic elastomer composition, excellent in both abrasion resistance and mechanical characteristics, obtained by heat-treating a mixture under molten condition thereof, the mixture including: 100 parts of at least one addition-polymerized block copolymer selected from a block copolymer and a hydrogenated product thereof; the block copolymer has a polymer block mainly including a structural unit derived from an aromatic vinyl compound and containing 1% by mass or more of a structural unit derived from a styrene having an alkyl group bonded to a benzene ring and a polymer block mainly including a structural unit derived from a conjugated diene compound, 10 to 300 parts olefin-based resin, 0.01 to 20 parts crosslinking agent; 1 to 50 parts crosslinking adjuvant containing one methacryloyl group, one acryloyl group, and one or more hydroxyl group, and 30 to 250 parts rubber softener; and a molded article including the said thermoplastic elastomer composition.

6 Claims, No Drawings

THERMOPLASTIC ELASTOMER COMPOSITION AND MOLDED ARTICLE

TECHNICAL FIELD

The present invention relates to a thermoplastic elastomer composition and a molded article including the thermoplastic elastomer composition.

BACKGROUND ART

In recent years, thermoplastic elastomers which are a rubber-like soft material not requiring a vulcanization process while having a mold processability similar to a thermoplastic resin have been used in the fields such as automobile parts, consumer electric appliance parts, electric wire coverings, medical care parts, footwear shoes, and sundry goods. Among the thermoplastic elastomers, styrene-based thermoplastic elastomers typically represented by a block copolymer or a hydrogenated product thereof are used as materials having excellent flexibility, mold processability, and so forth wherein the block copolymer or the hydrogenated product thereof has a polymer block including a structural unit derived from an aromatic vinyl compound and a polymer block including a structural unit derived from a conjugated diene compound; however, they are required to have improved abrasion resistance.

Meanwhile, the present applicant previously developed a following composition (1) aha thermoplastic elastomer which is excellent in recovery from distortion at a high temperature (heat resistance), mold processability, rubber characteristics, and flexibility (see PTL 1).
(1) A thermoplastic elastomer composition, wherein the composition is obtained by dynamically crosslinking a mixture under a molten condition thereof, the mixture having the mixing ratio: 100 parts by mass of at least one addition-polymerized block copolymer ($I_0$) selected from the group consisting of a block copolymer and a hydrogenated product thereof, wherein the block copolymer and the hydrogenated product thereof contains one or more polymer block (A) including a structural unit derived from an aromatic vinyl compound and one or mote polymer block (B) including a structural unit derived from a conjugated diene compound, and the polymer block (A) contains 1% by mass of a structural unit derived from an alkylstyrene in which at least one alkyl group having 1 to 8 carbon atoms is bonded to a benzene ring thereof; 10 parts by mass to 300 parts by mass of a polyolefin (II); 0 part by mass to 300 parts by mass of a softener for rubber (III); and 0.1 parts by mass to 20 parts by mass of a crosslinking agent (IV); and further the addition-polymerized block copolymer ($I_0$) is crosslinked at least in a portion of the polymer block (A) in the thermoplastic elastomer composition.

And thereafter, the present applicant further developed the following composition (2) as a thermoplastic elastomer composition giving a molded article which is excellent in recovery from distortion at a high temperature (heat resistance), extrusion-mold processability, and surface properties (see PTL 2).
(2) A thermoplastic elastomer composition, wherein the composition is obtained by heat treating a mixture under a molten condition thereof, the mixture including: 100 parts by mass of at least one addition-polymerized block copolymer (I) selected from the group consisting of a block copolymer and a hydrogenated product thereof, wherein the block copolymer and the hydrogenated product thereof contains a polymer block A mainly including a structural unit derived from an aromatic vinyl compound and contains 1% by mass or more of a structural unit (a) derived from an alkylstyrene in which an alkyl group having 1 to 8 carbon atoms is bonded to a benzene ring thereof and a polymer block B mainly including a structural unit derived from a conjugated diene compound; 10 parts by mass to 300 parts by mass of an olefin-based resin (II); 0.01 parts by mass to 20 parts by mass of a crosslinking agent (III); 0.5 parts by mass to 50 parts by mass of a crosslinking adjuvant (IV) having 2 or more methacryloyl group and hydroxyl group; and 30 parts by mass to 250 parts by mass of a softener for rubber (V); and the crosslinking agent (III) is an organic peroxide.

CITATION LIST

Patent Literature

PTL 1: Japanese Patent No. 394608
PTL 2: Japanese Patent No. 5085174

SUMMARY OF INVENTION

Technical Problem

It is disclosed in PTL 1 and PTL 2 that the thermoplastic elastomer compositions therein are excellent in various physical properties including heat resistance or in various characteristics; however, these compositions were not developed to solve the problem of improving abrasion resistance, so that these compositions do not necessarily have enough abrasion resistance that is required for various uses; and thus, it has been proved that they still need some additional improvements.

Accordingly, the problem of the present invention is to provide; a thermoplastic elastomer composition which is excellent in both mechanical characteristics and abrasion resistance; and a molded article including the thermoplastic elastomer composition.

Solution to Problem

The present invention relates to following [1] to [6].
[1] A thermoplastic elastomer composition, wherein the composition is obtained by heat-treating a mixture under a molten condition thereof, the mixture including:
100 parts by mass of at least one addition-polymerized block copolymer (I) selected from a group consisting of a block copolymer and a hydrogenated product thereof; the block copolymer has a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly including a structural unit derived from a conjugated diene compound,
10 parts by mass to 300 parts by mass of an olefin-based resin (II),
0.01 parts by mass to 20 parts by mass of a crosslinking agent (III),
1 part by mass to 50 parts by mass of a crosslinking adjuvant (IV) containing one methacryloyl group, one acryloyl group, and one or more hydroxyl group, and
30 parts by mass to 250 parts by mass of a softener for rubber (V).

[2] The thermoplastic elastomer composition according to [1], wherein the crosslinking adjuvant (IV) has an alkylene group having 3 to 12 carbon atoms.
[3] The thermoplastic elastomer composition according to [1] or [2], wherein the crosslinking adjuvant (IV) has an alkylene group having 3 to 12 carbon atoms and containing at least one hydroxyl group between the methacryloyl group and the acryloyl group.
[4] The thermoplastic elastomer composition according to any one of [1] to [3], wherein the crosslinking adjuvant (IV) is 2-hydroxy-3-acryloyloxypropyl methacrylate.
[5] The thermoplastic elastomer composition according to any one of [1] to [4], wherein the structural unit (a) is a structural unit derived from p-methylstyrene.
[6] A molded article containing the thermoplastic elastomer composition according to any one of [1] to [5].

Advantageous Effects of Invention

According to the present invention, it is possible to provide: a thermoplastic elastomer composition which is excellent in both mechanical characteristics and abrasion resistance; and a molded article including the thermoplastic elastomer composition.

DESCRIPTION OF EMBODIMENTS

In the following description, the restrictive wording with "being preferable" can be arbitrarily chosen and a combination of restrictive wordings with "being preferable" means being more preferable.

[Thermoplastic Elastomer Composition]

The thermoplastic elastomer composition of the present invention is a thermoplastic elastomer composition obtained by heat treating a mixture under a molten condition thereof, the mixture including:

100 parts by mass of at least one addition-polymerized block copolymer (I) selected from a group consisting of a block copolymer and a hydrogenated product thereof; the block copolymer has a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly including a structural unit derived from a conjugated diene compound, 10 parts by mass to 300 parts by mass of an olefin-based resin (II), 0.01 parts by mass to 20 parts by mass of a crosslinking agent (III), 1 part by mass to 50 parts by mass of a crosslinking adjuvant (IV) containing one methacryloyl group, one acryloyl group, and one or more hydroxyl group, and 30 parts by mass to 250 parts by mass of a softener for rubber (V).

Hereinafter, the respective components in the mixture will be described in order.

[(I) Component]

The (I) component is at least one addition-polymerized block copolymer selected from a group consisting of a block copolymer and a hydrogenated product thereof, wherein the block copolymer has a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof (hereinafter, this styrene is sometimes referred to as alkylstyrene) and a polymer block B mainly including a structural unit derived from a conjugated diene compound (hereinafter, this addition-polymerized block copolymer is sometimes referred to as simply the addition-polymerized block copolymer (I)).

It must he noted here that the phrase "mainly including a structural unit derived from an aromatic vinyl compound" means that on the basis of total mass of the polymer block A, 50% by mass or more of the structural unit derived from an aromatic vinyl compound (hereinafter, this structural unit is sometimes referred to as simply the aromatic vinyl compound unit) is contained therein. The content of the structural unit derived from an aromatic vinyl compound in the polymer block A is more preferably 70% by mass or more, still more preferably 90% by mass or more, while particularly preferably 95% by mass or more, each content being on the basis of total mass of the polymer block A.

Also, the phrase "mainly including a structural unit derived from a conjugated diene compound" means that on the basis of total mass of the polymer block B, 50% by mass or more of the structural unit derived from a conjugated theme compound (hereinafter, this structural unit is sometimes referred to as simply the conjugated diene compound unit) is contained therein. The content of the structural unit derived from a conjugated diene compound in the polymer block B is more preferably 70% by mass or more, still more preferably 90% by mass or more, while particularly preferably 95% by mass or more, each content being on the basis of total mass of the polymer block B.

Hereinafter, firstly the polymer block A and the polymer block B will be described in detail.

—Polymer Block A—

In the addition-polymerized block copolymer (I), the polymer block A corresponds to a hard segment of the thermoplastic elastomer, and the alkyl group which is bonded to a benzene ring in the structural unit (a) reacts with a crosslinking agent so as to play a role to introduce a crosslink to the hard segment including the polymer block A.

Illustrative example of the alkylstyrene giving the structural unit (a) in the polymer block A includes alkylstyrenes whose alkyl group has 1 to 8 carbon atoms such as o-alkylstyrenes, m-alkylstyrenes, p-alkylstyrenes, 2,4-dialkylstyrenes, 3,5-dialkylstyrenes, and 2,4,6-trialkylstyrenes, as well as halogenated alkylstyrenes in which one, or two or more of the hydrogen atoms of the alkyl group of the above-mentioned ally styrenes is (or are) substituted with a halogen atom (or hydrogen atoms). More specific example of the alkylstyrene giving the structural unit (a) includes o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene and p-dichoromethylstyrenes.

The polymer block A may have a unit derived from one, or two or more of the alkylstyrene giving the structural unit (a).

If the alkyl group, which is bonded to the benzene ring of the structural unit (a), has 9 or more carbon atoms, the reactivity thereof with the crosslinking agent (III) becomes lower, so that formation of the crosslinking structure becomes difficult. From the same viewpoint, in the alkylstyrene giving the structural unit (a), number of the carbon atoms in the alkyl group which is bonded to the benzene ring is preferably in the range of 1 to 5, more preferably in the range of 1 to 3, while still more preferably 1.

From the viewpoints of availability and reactivity with the crosslinking agent (III), the structural unit (a) is preferably a structural unit derived from a p-alkylstyrene, while the structural unit derived from p-methylstyrene is more preferable.

The addition-polymerized block copolymer (I) may have an aromatic vinyl compound unit other than the structural unit (a) as the aromatic vinyl compound unit that constitutes the polymer block A. Illustrative example of the other aromatic vinyl compound unit includes structural units derived from styrene, α-methylstyrene, β-methylstyrene, monofluorostyrene, difluorostyrene, monochlorostyrene, dichlorostyrene, methoxystyrene, vinyl naphthalene, vinyl anthracene, indene, or acetonaphthylene. The other aromatic vinyl compound unit may be one, or two or more kinds. Among them, the structural unit derived from styrene is preferable as the other aromatic vinyl compound unit.

The content ratio of the structural unit (a) in the polymer block A relative to the mass of the polymer block A that constitutes the addition-polymerized block copolymer (I) (if the addition-polymerized block copolymer (I) has two or more of the polymer block A, total mass of them is used) is 1% by mass or more, more preferably 5% by mass or more, still more preferably 10% by mass or more, while particularly preferably 20% by mass or more. On the other hand, the upper limit value thereof is not particularly restricted; however, the upper limit value is preferably 80% by mass or less, more preferably 60% by mass or less, still more preferably 45% by mass or less, while particularly preferably 40% by mass or less. All the structural units that constitute the polymer block A may be composed of the structural unit (a).

If the content ratio of the structural unit (a) in the polymer block A is less than 1% by mass, sufficient amount of the crosslink cannot be introduced into the polymer block A, so that the thermoplastic elastomer composition to be obtained tends to be poor in the heat resistance.

The bonding form of the structural unit (a) with the aromatic vinyl compound unit other than the structural unit (a) in the polymer block A may be any form selected from a random form, a block form, a tapered form, a tapered block form, and a combination of two or more of these forms.

The polymer block A may have, in addition to the aromatic vinyl compound unit having the structural unit (a), a structural unit derived from other polymerizable compound. In this case, the content ratio of the structural unit derived from the other polymerizable compound is preferably 50% by mass or less, more preferably 30% by mass or less, still more preferably 10% by mass or less, while particularly preferably 5% by mass or less, each content being on the basis of total mass of the polymer block A. In this case, illustrative example of the other polymerizable compound includes conjugated diene compounds such as butadiene, isoprene, 2,3-dimethyl-1,3-butadiene, 1,3-pentadiene, and 1,3-hexadiene; and 1-butene, pentene, hexene, and methyl vinyl ether. The bonding form of these other polymerizable compound may be any form selected from a random form, a block form, a tapered form, a tapered block form, and a combination of two or more of these forms.

The content of the polymer block A in the addition-polymerized block copolymer (I) is preferably in the range of 5% by mass to 40% by mass, while more preferably in the range of 15% by mass to 40% by mass. If the content is 5% by mass or more, mechanical characteristics of the thermoplastic elastomer composition become better, and the heat resistance thereof tends to be increased. If the content is 40% by mass or less, the thermoplastic elastomer composition tends to be excellent in flexibility. Meanwhile, the content of the polymer block A in the addition-polymerized block copolymer (I) is the value obtained by a $^1$H-NMR spectrum.

—Polymer Block B—

Illustrative example of the conjugated diene compound from which the structural unit that constitutes the polymer block B is derived includes isoprene, butadiene, hexadiene, 2,3-dimethyl-1,3-butadiene, and 1,3-pentadiene. The polymer block B may be formed of only one, or two or more of the conjugated diene compounds. Among them, the polymer block B is formed of preferably the structural unit derived from butadiene, isoprene, or a mixture of butadiene and isoprene, while more preferably formed of the structural unit derived from a mixture of butadiene and isoprene.

Meanwhile, there is no particular restriction with regard to the microstructure of the polymer block B (1,2-bond structure, 1,4-bond structure, 3,4-bond structure, and so forth) and the content ratio thereof. Further, in the case that the polymer block B has the structural unit derived from two or more conjugated dienes, their bonding form may be any form selected from a random form, a block form, a tapered form, a tapered block form, and a combination of two or more of these forms.

The polymer block B may contain a small amount of structural unit derived from a polymerizable compound other than the structural unit derived from the conjugated diene. In this case, the content ratio of the other polymerizable compound is 50% by mass or less, preferably 30% by mass or less, while more preferably 10% by mass or less, each being on the basis of total mass of the polymer block B. Illustrative example of the other polymerizable compound includes styrene, α-methylstyrene, and alkylstyrenes (preferably p-methylstyrene) giving the structural unit (a).

From the viewpoints of weatherability, heat resistance, and the like of the thermoplastic elastomer composition of the present invention, the polymer block B is preferably a polyisoprene block including a structural unit derived from mainly isoprene or a hydrogenated polyisoprene block in which part or all of a carbon-carbon double bond in the polyisoprene block is hydrogenated; a polybutadiene block including a structural unit derived from mainly butadiene or a hydrogenated polybutadiene block in which part or all of a carbon-carbon double bond based on the butadiene unit is hydrogenated; or a copolymer block including a structure derived from a mixture of mainly isoprene and butadiene or a hydrogenated copolymer block in which part or all of a carbon-carbon double bond in the copolymer block is hydrogenated.

In the polyisoprene block capable of becoming a constituting block of the polymer block B, the structural unit derived from isoprene (hereinafter, sometimes this is referred to as simply the isoprene unit) before hydrogenation thereof includes at least one kind selected from the group consisting of a 2-methyl-2-butene-1,4-diyl group [—CH$_2$—C(CH$_3$)=CH—CH$_2$; 1,4-bonded isoprene unit], an isopropenylethylene group [—CH(C(CH$_3$)=CH$_2$)—CH$_2$; 3,4-bonded isoprene unit], and a 1-methyl-1-vinylethylene group [—CH(C(CH$_3$)=CH$_2$)—C$_2$—; 1,2-bonded isoprene unit], wherein the ratio of each unit is not particularly restricted.

In the polybutadiene block capable of becoming a constituting block of the polymer block B, the structural unit derived from butadiene (hereinafter, sometimes this is referred to as simply the butadiene unit) before hydrogenation thereof preferably includes 2-butene-1,4-diyl group (—CH$_2$—CH═CH—CH$_2$—; 1,4-bonded butadiene unit) with the content thereof being in the range of 70 mol % to 20 mol %, especially in the range of 65 mol % to 40 mol %, and a vinyl ethylene group [—CH(CH═CH$_2$)—CH$_2$; 1,2-bonded butadiene unit] with the content thereof being in the range of 30 mol % to 80 mol %, especially in the range of 35 mol % to 60 mol %. If the content of the 1,4-bond structure unit in the polybutadiene block is in the range of 70 mol % to 20 mol % as mentioned above, the rubber elasticity tends to become better.

In the copolymer block which is capable of becoming a constituting block of the polymer block B and includes the mixture of isoprene and butadiene, before hydrogenation thereof, the isoprene unit includes a 2-methyl-2-butene-1,4-diyl group, an isopropenylethylene group, and 1-methyl-1-vinylethylene group, and the butadiene unit includes a 2-butene-1,4-diyl group and a vinyl ethylene group, wherein the ratio of each unit is not particularly restricted. In the copolymer block including a mixture of isoprene and butadiene, arrangement of the isoprene unit and the butadiene unit may be any form selected from a random form, a block form, a tapered form, a tapered block form, and a combination of two or more of these forms. And in the copolymer block including the mixture of isoprene and butadiene, from viewpoint of improving rubber elasticity, the mass ratio of the isoprene unit/the butadiene unit is preferably in the range of 10/90 to 90/10, more preferably in the range of 30/70 to 70/30, still more preferably in the range of 35/65 to 65/35, while particularly preferably in the range of 40/60 to 65/35.

From viewpoints of heat resistance and weatherability of the thermoplastic elastomer composition which contains the addition-polymerized block copolymer (I), part or all of the carbon-carbon double bond in the polymer block B of the addition-polymerized block copolymer (I) is preferably hydrogenated. The hydrogenation rate of the polymer block B in this case is preferably 60 mol % or more, more preferably 80 mol % or more, while still more preferably 95 mol % or more. Meanwhile, the hydrogenation rate of the carbon-carbon double bond based on the conjugated diene compound unit of the polymer block B can be calculated from the amounts of the carbon-carbon double bond in the polymer block B before and after the hydrogenation reaction by the $^1$H-NMR measurement. Especially if the hydrogenation rate is near to 100 mol %, at the time when the thermoplastic elastomer composition of the present invention is produced, the reaction ratio of the polymer block B with the crosslinking agent (III) becomes lower, but the reaction of the structural unit (a) of the polymer block A with the crosslinking agent (III) is facilitated, so that the introducing ratio of the crosslink into the polymer block A which constitutes the hard segment becomes higher; and thus, this is preferable.

There is no particular restriction in the method for hydrogenation of the carbon-carbon double bond in the polymer block B; and therefore, a known method may be used.

In the addition-polymerized block copolymer (I), so far as the polymer block A and the polymer block B are bonded, the bonding style thereof is not restricted; and thus, any bonding style selected from linear bonding, branched bonding, radial bonding, and combination of two or more of them may be allowed. Among them, the bonding style of the polymer block A with the polymer block B is preferably linear bonding, wherein illustrative example thereof includes a triblock copolymer represented by A-B-A, a tetrablock copolymer represented by A-B-A-B, and a pentablock copolymer represented by A-B-A-B-A, provided that the polymer block A is represented by A and the polymer block B is represented by B. Among them, the triblock copolymer (A-B-A) is preferably used from viewpoints of ease of production of the addition-polymerized block copolymer (I), flexibility, and the like.

In the addition-polymerized block copolymer (I), from viewpoints of mechanical characteristics, mold processability, and the like of the thermoplastic elastomer composition to be obtained, the number average molecular weight of the polymer block A is preferably in the rang 2,500 to 75,000, while more preferably in the range of 5,000 to 50,000; the number average molecular weight of the polymer block B is preferably in the range of 10,000 to 400,000, while more preferably in the range of 30,000 to 350,000; and the number average molecular weight of entirety of the addition-polymerized block copolymer (I) is preferably in the range of 12,500 to 2,000,000, more preferably in the range of 50,000 to 1,000,000, still more preferably in the range of 100,000 to 500,000, while particularly preferably in the range of 200,000 to 450,000. Meanwhile, the number average molecular weight (Mn) in this description means the value obtained from a calculation curve of the standard polystyrene by the method of a gel permeation chromatography (GPC).

[(II) Component]

Illustrative example the olefin-based resin (II) includes ethylene-based polymer, a propylene-based polymer, poly (1-butene), and poly(4-methyl-1-pentene). These, resins may be used singly, or concurrently two or more of them.

It must be noted here that the ethylene-based polymer means a polymer with the content of a structural unit derived from ethylene (hereinafter, this content is sometimes referred to as simply the ethylene content) being 60 mol % or more, wherein the ethylene content is preferably 70 mol % or more, while more preferably 80 mol % or more. Also, the propylene-based polymer means a polymer with the content of a structural unit derived from propylene (hereinafter, this content is sometimes referred to as simply the propylene content) being 60 mol % or more, wherein the propylene content is preferably 70 mol % or more, more preferably 80 mol % or more, while particularly preferably 90 mol % or more.

Specific example of the ethylene-based polymer includes: ethylene homopolymers such as high density polyethylene, medium density polyethylene, and low density polyethylene; ethylene-1-butene copolymer; ethylene-1-hexene copolymer; ethylene-1-heptene copolymer; ethylene-1-octene copolymer; ethylene-4-methyl-1-pentene copolymer; ethylene-vinyl acetate copolymer; ethylene-acrylic acid copolymer; ethylene-acrylate ester copolymer; ethylene-methacrylic acid copolymer; ethylene-methacrylate ester copolymer; and modified products of these polymers.

Specific example of the propylene-based polymer includes: propylene homopolymer, propylene-ethylene random copolymer, propylene-ethylene block copolymer, propylene-1-butene copolymer, propylene-ethylene-1-butene copolymer, propylene-4-methylpentene-1 copolymer, and modified products of these polymers.

Illustrative example of the modified product mentioned above includes a product obtained by graft-copolymerization of the propylene-based resin with a modifying agent and a product obtained by copolymerization of a main chain of the polypropylene-based resin with a modifying agent. Specific example of the modifying agent includes: unsaturated dicarboxylic acids such as maleic acid, citraconic acid, halogenated maleic acid, itaconic acid, cis-4-cyclohexene- 1,2-dicarboxylic acid, and endo-cis-bicyclo[2.2.1]-5-heptene-2,3-dicarboxylic acid; esters, amides, or imides of unsaturated dicarboxylic acids; unsaturated dicarboxylic acid anhydrides such as maleic anhydride, citraconic anhydride, halogenated maleic anhydride, itaconic anhydride, cis-4-cyclohexene-1,2-dicarboxylic anhydride, and endo-cis-bicyclo[2.2.1]-5-heptene-2,3-dicarboxylic anhydride; unsaturated monocarboxylic acids such as acrylic acid, methacrylic acid, and crotonic acid; esters of unsaturated monocarboxylic acids (methyl acrylate, ethyl acrylate, methyl methacrylate, ethyl methacrylate, and so forth), and amides or imides of unsaturated monocarboxylic acids. Meanwhile, an unmodified product is preferable as the olefin-based resin (II).

Among them all, from viewpoint of mold processability, the olefin-based resin (II) is preferably ethylene-based polymers such as high density polyethylene, medium density polyethylene, and low density polyethylene; and propylene-based polymers such as propylene homopolymer, ethylene-propylene random copolymer, and ethylene-propylene block copolymer, more preferably propylene-based polymers, while still more preferably propylene homopolymer.

From viewpoints of mold processability and abrasion resistance of the thermoplastic elastomer composition, the melt flow rate (MFR) of the olefin-based resin (II) measured under the conditions of 230° C. and 2.16 kg is preferably 0.1 g/10 min or more, more preferably in the range of 0.1 g/10 min to 50 g/10 min, still more preferably in the range of 0.1 g/10 min to 20 g/10 min, while particularly preferably in the range of 0.1 g/10 min to 10 g/10 min. Meanwhile, the MFR values are obtained by measurement in conformity with JIS K7210.

The content of the olefin-based resin (II) in the mixture to be used in the present invention is in the range of 10 parts by mass to 300 parts by mass, preferably in the range of 10 parts by mass to 200 parts by mass, more preferably in the range of 15 parts by mass to 100 parts by mass, more preferably in the range of 20 parts by mass to 60 parts by mass, still more preferably in the range of 20 parts by mass to 40 parts by mass, while particularly preferably in the range of 20 parts by mass to 37 parts by mass, each content being relative to 100 parts by mass of the addition-polymerized block copolymer (I). If the content is less than 10 parts by mass relative to 100 parts by mass of the addition-polymerized block copolymer (I), mold process ability of the thermoplastic elastomer composition to be obtained becomes poor; on the other hand, if the content thereof is more than 300 parts by mass, flexibility and rubber elasticity of the thermoplastic elastomer composition to be obtained becomes lower.

[(III) Component]

With regard to the crosslinking agent (III), a crosslinking agent which can act to the structural unit (a) present in the polymer block A of the addition-polymerized block copolymer (I) during the time of producing the thermoplastic elastomer composition of the present invention by the heat treatment under a molten condition thereof so as to be able to form crosslink in the acted part of the polymer block A may be used. Suitable crosslinking agent can be selected in accordance with the of the heat treatment (for example, treatment temperature and treatment time) as well as with considering the reactivity and so forth; and especially, one, or more kinds selected from the group consisting of organic peroxides and bismaleimide-based compounds are preferable, while organic peroxides are more preferable.

Illustrative example of the organic peroxide includes: dialkyl monoperoxides such as dicumyl peroxide, di-t-butyl peroxide, t-butyl cumyl peroxide; diperoxides such as 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane, and n-butyl-4,4-bis(t-butylperoxy)valerate; diacyl peroxides such a benzoyl peroxide, p-chlorobenzoyl peroxide, and 2,4-dichlorobenzoyl peroxide; monoacyl alkyl peroxides such as t-butylperoxy benzoate; percarbonates such a t-butylperoxy isopropyl carbonate; and diacyl peroxides such as diacetyl peroxide and lauroyl peroxide. These may be used singly, or concurrently two or more of them. Among these peroxides, from viewpoint of reactivity, dialkyl monoperoxides such as dicumyl peroxide and diperoxides such as 2,5-dimethyl-2,5-di(t-butylperoxy)hexane are preferable.

With regard to the bimaleimide-based compound, any bismaleimide-based compound may be used so far as the said compound is capable of crosslinking in the alkyl group part bonded to the benzene ring and in the unsaturated double bond part; and therefore, illustrative example thereof includes N,N'-m-phenylene bismaleimide, N,N'-p-phenylene bismaleimide, N,N'-p-phenylene(1-methyl) bismaleimide, N,N'-2,7-naphthene bismaleimide, N,N'-m-naphthene bismaleimide, N,N'-m-phenylene-4-methyl bismaleimide, N,N'-m-phenylene(4-ethyl) bismaleimide, and toluylene bismaleimide. Among these compounds, from viewpoint of reactivity, N,N'-m-phenylene bismaleimide is preferable. These compounds may be used singly, or concurrently two or more of them.

The content of the crosslinking agent (III) in the mixture to be used in the present invention is in the range of 0.0 parts by mass to 20 parts by mass, preferably in the range of 0.01 parts by mass to 10 parts by mass, more preferably in the range of 0.1 parts by mass to 10 parts by mass, while particularly preferably in the range of 0.3 parts by mass to 6 parts by mass, each content being relative to 100 parts by mass of the addition-polymerized block copolymer (I). If the content is less than 0.01 parts by mass relative to 100 parts by mass of the addition-polymerized block copolymer (I), the crosslinking bond cannot be sufficiently formed; on the other hand, if the content is more than 20 parts by mass, there are problems such as bleeding out of the softener for rubber (V) (this will be discussed later) and deterioration of dynamic characteristics of the thermoplastic elastomer composition.

[(IV) Component]

The mixture to be used in the present invention is made to contain the crosslinking adjuvant (IV) having one methacryloyl group, one acryloyl group, and one or more hydroxyl group. By containing the crosslinking adjuvant (IV) having one methacryloyl group, one acryloyl group, and one or more hydroxyl group, the thermoplastic elastomer composition of the present invention can dramatically increase abrasion resistance and mechanical characteristics as compared with compositions using a conventional crosslinking adjuvant not having an acryloyl group. The detailed mechanism of this is not clear; however, this is presumably caused by that use of the crosslinking adjuvant (IV) having the specific structure increases compatibility of the crosslinking adjuvant thereby leading to the crosslinking structure disposed uniformly.

The number of the hydroxyl group possessed by the crosslinking adjuvant (IV) may be one or more, wherein the upper limit thereof is preferably 8 or less, more preferably 6 or less, while still more preferably 3 or less. Particularly preferable number of the hydroxyl group possessed by the crosslinking adjuvant (IV) is one.

The crosslinking adjuvant (IV) may further have, besides the methacryloyl group, the acryloyl group, and the hydroxyl group, other functional group such as, for example, one or more kind selected from the group consisting of an amino group, an epoxy group, a fluoro group, a silyl group, and the like.

From viewpoints of mechanical characteristics, abrasion resistance, and heat resistance, the crosslinking adjuvant (IV) having, together with one methacryloyl group, one acryloyl group, and one or more hydroxyl group, an alkylene group having 3 to 12 carbon atoms (preferably in the range of 3 to 8, more preferably in the range of 3 to 6, while still more preferably 3) is preferable. From viewpoints of abrasion resistance and heat resistance, the crosslinking adjuvant (IV) having an alkylene group having 3 to 12 carbon atoms which contain at least one hydroxyl group between the methacryloyl group and the acryloyl group is preferable.

Meanwhile, both the methacryloyl group and the acryloyl group may be bonded to an oxygen atom, namely, these groups may be a methacryloyloxy group and an acryloyloxy group, respectively.

Among them, from viewpoints of abrasion resistance and heat resistance, 2-hydroxy-3-acryloyloxypropyl methacrylate is preferable as the crosslinking adjuvant (IV).

These crosslinking adjuvants (IV) may be produced, for example, by displacing two of the hydroxyl groups, of a trivalent or higher alcohol with one acryloyloxy group and one methacryloyloxy group. With regard to the trivalent or higher alcohol, trivalent or higher alcohols having 3 to 12 carbon atoms (preferably in the range of 3 to 8, more preferably in the range of 3 to 6, while still more preferably 3) may be mentioned, wherein illustrative example thereof includes glycerin (glycerol), trimethylolpropane, pentaerythritol, diglycerin, ditrimethylolpropane, and dipentaerythritol.

The content of the crosslinking adjuvant (IV) in the mixture to be used in the present invention is in the range of 1 parts by mass to 50 parts by mass, preferably in the range of 5 parts by mass to 45 parts by mass, more preferably in the range of 10 parts by mass to 40 parts by mass, while still more preferably in the range of 20 parts by mass to 37 parts by mass, each content being relative to 100 parts by mass of the addition-polymerized block copolymer (I). If the content is less than 1 part by mass relative to 100 parts by mass of the addition-polymerized block copolymer (I), mechanical characteristics, abrasion resistance, and heat resistance of the thermoplastic elastomer composition to be obtained become poor; on the other hand, if the content is more than 50 parts by mass, flexibility of the thermoplastic elastomer composition to be obtained becomes insufficient.

The mixture to be used in the present invention may contain a crosslinking adjuvant other than the crosslinking adjuvant (IV) having one methacryloyl group, one acryloyl group, and one or more hydroxyl group so far as the effects of the present invention are not impaired. In this case, from viewpoints of mechanical characteristics, abrasion resistance, and heat resistance, the content thereof is preferably 30% by mass or less, more preferably 15% by mass or less, while still more preferably 5% by mass or less, each content being relative to the cross linking adjuvant (IV).

[(V) Component]

Illustrative example of the softener for rubber (V) includes oil-based process oils such as a paraffin-based process oil and a naphthene-based process oil; aromatic-based process oils; silicone oil; vegetable oil-based softeners such as peanut oil and rosin; and synthetic softeners, such as ethylene-α-olefin oligomer, liquid polybutene, and low molecular weight polybutadiene.

With regard to the softener for rubber (V), especially a softener having dynamic viscosity at 40° C. in the range of 20 mm$^2$/s to 800 mm$^2$/s is preferable (preferably in the range of 40 mm$^2$/s to 600 mm$^2$/s, while still more preferably in the range of 60 mm$^2$/s to 500 mm$^2$/s). Meanwhile, the dynamic viscosity values are obtained by measurement in conformity with JIS K2283.

With regard to the softener for rubber (V), an oil-based process oil is preferable, while a paraffin-based process oil is more preferable.

The softener for rubber (V) may be used singly, or concurrently two or more of the softeners.

With regard to the softener for rubber (V), such as, for example, paraffin-based process oils and naphthene-based process oils (preferably paraffin-based process oils) in the series of "Diana Process Oil" (trade name, marketed by Idemitsu Kosan Co., Ltd.) may be used.

The content of the softener for rubber (V) in the mixture to be used in the present invention is in the range of 30 parts by mass to 250 parts by mass, preferably in the range of 50 parts by mass to 200 parts by mass, more preferably in the range of 50 parts by mass to 140 parts by mass, while still more preferably in the range of 50 parts by mass to 130 parts by mass, each content being relative to 100 parts by mass of the addition-polymerized block copolymer (I). If the content is more than 250 parts by mass relative to 100 parts by mass of the addition-polymerized block copolymer (I), not only the mechanical characteristics of the obtained thermoplastic elastomer composition decreases, but also the softener for rubber (V) tends to readily bleed out from a molded article obtained from the thermoplastic elastomer composition. On the other hand, if the content is less than 30 parts by mass, flexibility of the thermoplastic elastomer composition becomes insufficient.

[Other Components]

The mixture to be used in the present invention may contain other polymer so far as the effects of the present invention are not impaired. Illustrative example of the other polymer includes polyphenylene ether-based resins; polyamide-based resins such as polyamide 6, polyamide 6·6, polyamide 6·10, polyamide 11, polyamide 12, polyamide 6·12, polyhexamethylenediamine terephthalamide, polyhexamethylenediamine isophthalamide, and xylene group-containing polyamide; polyester-based resins such as polyethylene terephthalate and polybutylene terephthalate; acryl-based resins such as poly(methyl acrylate) and poly(methyl methacrylate); polyoxymethylene-based resins such as polyoxymethylene homopolymer and polyoxymethylene copolymer; styrene-based resins such as styrene homopolymer, α-methylstyrene homopolymer, acrylonitrile-styrene resin, and acrylonitrile-butadiene-styrene resin; polycarbonate resins; ethylene-propylene copolymer rubber (EPM) and ethylene-propylene-non-conjugated diene copolymer rubber (EPDM); styrene-butadiene copolymer rubber, styrene-isoprene copolymer rubber, or hydrogenated products or modified products of them; natural rubber; synthetic isoprene rubber, liquid polyisoprene rubber, or hydrogenated products or modified products of them; chloroprene rubber; acryl rubber; butyl rubber, acrylonitrile-butadiene rubber, epichlorohydrin rubber; silicone rubber; fluorine-containing rubber; chlorosulfonated polyethylene; urethane rubber; polyurethane-based elastomer; polyamide-based elastomer; styrene-based elastomer; polyester-based elastomer, and soft vinyl chloride resin. These may be used singly, or concurrently two or more of them.

In the case that the mixture contains these other polymers, the content thereof (if two or more polymers are contained, total content of them) is, for example, preferably 200 parts by mass or less, more preferably 100 parts by mass or less, more preferably 50 parts by mass or less, still more preferably 20 parts by mass or less, while particularly preferably 10 parts by mass or less, each content being relative to 100 parts by mass of the addition-polymerized block copolymer (I), so far as mechanical characteristics of the thermoplastic elastomer composition to be obtained are not impaired.

Further, the mixture to be used in the present invention may contain inorganic filler if necessary. Illustrative example of the inorganic filler includes calcium carbonate, talc, clay, synthetic silicon, titanium oxide, carbon black, barium sulfate, mica, glass fiber, whisker, carbon fiber, magnesium carbonate, glass powder, metal, powder, kaolin, graphite, molybdenum disulfide, and zinc oxide, wherein one, or two or more of them may be contained in the mixture. If the mixture contains inorganic filler, the content thereof is within the range not impairing the effects of the present invention, for example, preferably 50 parts by mass or less, more preferably 20 parts by mass or less, while still more preferably 10 parts by mass or less, each content being relative to 100 parts by mass of the thermoplastic elastomer composition.

Further, the mixture to be used in the present invention may contain, if necessary, one kind or more selected from the group consisting of flame retardant, lubricant, light stabilizer, pigment, heat stabilizer, anti-clouding agent, antistatic agent, anti-blocking agent, UV absorber, heat resistant stabilizer, antioxidant, coloring agent, and so forth. Among them, illustrative example of the antioxidant includes hindered phenol-based antioxidants, hindered amine-based antioxidants, phosphorous-based antioxidants, and sulfur-based antioxidants.

(Production Method of the Thermoplastic Elastomer Composition)

The thermoplastic elastomer composition of the present invention may be obtained by heat treatment of the above-mentioned mixture containing each of the components with the respective above-mentioned amounts under a molten condition thereof. From a viewpoint in order to dynamically crosslink the mixture, the heat treatment is preferably carried out with stirring or mixing the mixture.

With regard to the apparatus to carry out the heat treatment of the mixture under a molten condition thereof, any melt kneading apparatus that can uniformly mix respective components may be used. Illustrative example of the apparatus like this includes melt kneaders such as a single screw extruder, a twin screw extruder, a Banbury mixer, a heat roll, and various kneaders. Among them, a twin screw extruder is preferable from viewpoint that the shear force during kneading is large so that dispersion can be made finely and uniformly, and also continuous operation is possible.

In the case that the thermoplastic elastomer composition of the present invention is produced by using a single screw extruder or a twin screw extruder, one extruder may be used, or alternatively, in order to disperse respective components more effectively, heat treatment (preferably melt kneading) may be successively carried out in stages by using two or more extruders.

Temperature of the heat treatment may be arbitrarily selected in the temperature range at which the olefin-based resin (II) is melted and the reaction of the addition-polymerized block copolymer (I) with the crosslinking agent (III) can take place. Accordingly, generally the temperature is preferably in the range of 140° C. to 270° C., more preferably in the range of 160° C. to 240° C. while still more preferably in the range of 170° C. to 240° C. The heat treatment time is preferably in the range of 30 seconds to 5 minutes, while more preferably in the range of 45 seconds to 3 minutes.

By molding the thermoplastic elastomer composition obtained in the way as described above by using heretofore known methods such as, for example, extrusion molding, injection molding, press molding, and calendar molding, the molded article of the present invention can be obtained. Further, by a two-color molding method, a composite with other members (for example, polymer materials such as polyethylene, polypropylene, olefin-based elastomer, ABS resin, and polyamide, as well as metal, wood, and cloth) may be produced.

Meanwhile, the melt flow rate (MFR) of the thermoplastic elastomer composition of the present invention measured under the conditions of 230° C. and 10 kg falls approximately in the range of 0.5 g/10 min to 40 g/10 min, more specifically 1 g/10 min to 3 g/10 min, while still more specifically in the range of 1.5 g/10 min to 27 g/10 min. When the MFR falls within this range, the mold processability is good.

The abrasion loss thereof by the DIN abrasion test falls approximately in the range of 1 $mm^3$ to 100 $mm^3$, while more specifically in the range of 5 $mm^3$ to 70 $mm^3$.

The tensile strength at break thereof falls approximately in the range of 10 MPa to 30 MPa, while more specifically in the range of 10 MPa to 20 MPa. The tensile elongation at break thereof falls approximately in the range of 500% to 900%, while more specifically in the range of 550% to 800%.

Meanwhile, the MFR, the abrasion loss, the tensile strength at break, and the tensile elongation at break of the thermoplastic elastomer composition as described above are the values measured by the methods described in EXAMPLES.

EXAMPLES

Hereinafter, the present invention will be described in more detail by way of Examples and the like. However, the present invention is not limited to such Examples.

Furthermore, the following are used as the respective components used in Examples and Comparative Examples below.

Moreover, the number average molecular weight was determined as a value relative to polystyrene as a standard by carrying out the gel permeation chromatography (GPC) measurement under the following conditions.

(Conditions for GPC Measurement)
Column: "TSKgel G4000HXL" (trade name)×2 (manufactured by Tosoh Corporation (column temperature: 40° C.)
Mobile phase: tetrahydrofuran (flow rate: 1 mL/min)
Detector: differential refractometer (a multi-wavelength detector (detection wavelength: 254 nm) is further connected)
Standard material: TSK standard polystyrene (manufactured by Tosoh Corporation
Sample concentration: 0.06% by mass

[Production of Addition-Polymerized Block Copolymer]

[Production Example 1] Production of Addition-Polymerized Block Copolymer (I)-1

Into an autoclave equipped with an agitating apparatus were taken 30 kg of cyclohexane, 14 mL of sec-butyl lithium (1.3 M cyclohexane solution), and 778 g of a mixture of p-methylstyrene/styrene=30/70 (mass ratio); and polymerization was carried out at 50° C. for 120 minutes. Then, into it was added 3,630 g of a mixture of isoprene/butadiene=60/40 (mass ratio); and polymerization was carried out for 120 minutes. Thereafter, into it was further added 778 g of a mixture of p-methylstyrene/styrene=30/70 (mass ratio); and after polymerization was carried out for 120 minutes, the polymerization was stopped by adding methanol to obtain a reaction mixed liquid containing poly(p-methylstyrene/styrene)-poly(isoprene/butadiene)-poly(p-methylstyrene/styrene) triblock copolymer.

Into the reaction mixed liquid was added a hydrogenation catalyst prepared from nickel octoate and triisopropyl aluminum; and a hydrogenation reaction was carried out at 80° C. under a hydrogen atmosphere of 1 MPa for 5 hours to obtain a hydrogenated product of the poly(p-methylstyrene/styrene)-poly(isoprene/butadiene)-poly(p-methylstyrene/styrene) triblock copolymer [hereinafter, this hydrogenated product is referred to as the addition-polymerized block copolymer (I)-1].

The number average molecular weight (Mn) of the obtained addition-polymerized block copolymer (I)-1 was 360,000; the ratio of each polymer block was 15/70/15 (mass ratio) [polymer block A/polymer block B/polymer block A]; and the hydrogenation rate of the poly(isoprene/butadiene) block was 99 mol % from the $^{1}$H-NMR measurement result.

[Production Example 2] Production of Addition-Polymerized Block Copolymer (1) (for Comparison)

Into an autoclave equipped with an agitating apparatus were taken 30 kg of cyclohexane and 20 mL of a cyclohexane solution of 1.3 M sec-butyl lithium; and then, 778 g of styrene was added to it for the period of 30 minutes; and polymerization was carried out at 50° C. for 120 minutes. Then, into it was added 3,630 g of a mixture of isoprene/butadiene=60/40 (mass ratio) for the period of 60 minutes; and polymerization was carried out for 120 minutes at the same temperature. Thereafter, into it was further added 778 g of styrene for the period of 30 minutes; and after polymerization was carried out for 120 minutes at the same temperature to obtain a reaction mixed liquid containing polystyrene-poly(isoprene/butadiene)-polystyrene triblock copolymer.

Into the reaction mixed liquid was added a hydrogenation catalyst prepared from nickel octoate and triisopropyl aluminum; and a hydrogenation reaction was carried out at 80° C. under a hydrogen atmosphere of 1 MPa for 5 hours to obtain a hydrogenated product of the polystyrene-poly(isoprene/butadiene)-polystyrene triblock copolymer [hereinafter, this hydrogenated product is referred to as the addition-polymerized block copolymer (1)].

The number average molecular weight (Mn) of the obtained addition-polymerized block copolymer (1) was 360,000; the ratio of each polymer block was 15/70/15 (mass ratio); and the hydrogenation rate of the poly(isoprene/butadiene) block was 99 mol % from the $^{1}$H-NMR measurement result.

Physical properties of the addition-polymerized block copolymers obtained in Production Examples 1 and 2 are summarized in Table 1.

TABLE 1

| | Additon-polymerized block copolymer | Aromatic vinyl compound unit [Polymer block A] (mass ratio) | Conjugated diene compound [Polymer block B] (mass ratio) | Ratio of polymer blocks [A/B/A] (mass ratio) | Number average molecular weight | Hydrogenation rate (mol %) |
|---|---|---|---|---|---|---|
| Production Example 1 | (I)-1 | p-MeSt/St (30/70) | isoprene/butadiene (60/40) | 15/70/15 | 360,000 | 99 |
| 2 | (1) | St | isoprene/butadiene (60/40) | 15/70/15 | 360,000 | 99 |

<Explanation of Abbreviations in Table 1> p-MeSt/St: structural unit derived from p-methylstyrene/structural unit derived from styrene

[Olefin-Based Resin (II)]

Propylene homopolymer [trade name: "Prime Polypro E111G"; MFR: 0.5 g/10 min (230° C., 2.16 kg); melting point: 165° C.; manufactured by Prime Polymer Co., Ltd.]

[Crosslinking Agent (III)]

(III)-1: 2,5-Dimethyl-2,5-di(t-butylperoxy)hexane [trade name: "Perhexa 25B-40"; manufactured by NOF Corp.]

(III)-2: Dicumyl peroxide [trade name; "Percumyl D-40"; manufactured by NOF Corp.]

[Crosslinking Adjuvant (IV)]

(IV)-1: 2-Hydroxy-3-acryloyloxypropy methacrylate [trade name: "NK Ester 701A"; manufactured by Shin-Nakamura Chemical Co., Ltd.]

(2): Glycerol dimethacrylate [trade name: "NK Ester 701"; manufactured by Shin-Nakamura Chemical Co., Ltd.]

(3): Trimethylolpropane trimethacrylate [trade name: "NK Ester TMPT"; manufactured by Shin-Nakamura Chemical Co., Ltd.]

(4): Triallyl isocyanurate [trade name: "TAIC WH-60"; manufactured by Nippon Kasei Chemical Co., Ltd.]

(5): Hexanediol dimethacrylate [trade name: "NK Ester HD-N"; manufactured by Shin-Nakamura Chemical Co., Ltd.]

[Softener for Rubber (V)]

(V)-1: Paraffin-based process oil [trade name: "PW-380"; dynamic viscosity: 381.6 mm$^2$/s (40° C.); manufactured by Idemitsu Kosan Co., Ltd.]

(V)-2: Paraffin-based process oil [trade name: "PW-90"; dynamic viscosity: 95.54 mm$^2$/s (40° C.); manufactured by Idemitsu Kosan Co., Ltd.]

Examples 1 to 5 and Comparative Examples 1 to 6

After respective components shown in Table 2 was premixed with each blending ratio (unit: parts by mass) to obtain a mixture, whole of this mixture was fed to a twin screw extruder (manufactured by The Japan Steel Works, Ltd.), melt kneaded at 170° C. to 200° C. and the rotation speed of 300 min$^{-1}$, and then it was hot-cut to produce a thermoplastic elastomer composition in the form of pellets.

The obtained thermoplastic elastomer composition in the form of pellets was injection molded by using the injection molding machine ("IS-55 EPN": mold clamping pressure of 55×10$^3$ kg; manufactured by Toshiba Machine Co., Ltd.) under the conditions of the melting temperature at 230° C. and the mold temperature at 40° C. to obtain a molded article in the form of a sheet with the size of 110 mm×110 mm×2 mm (length×width×thickness).

By using the thermoplastic elastomer composition in the form of a pellet or in the form of a sheet-molded article, each physical property was measured by the following method. The results thereof are shown in Table 2.

(1) Measurement of Melt Flow Rate (MFR)

MFR (g/10 min) of the thermoplastic elastomer composition in the form of pellets was measured by the method in conformity with JIS K7210 under the conditions of 230° C. and 10 kg of the load.

(2) Measurement of Abrasion Loss

Abrasion resistance of the sheet-molded article was studied in conformity with JIS K6264-2 by using the DIN abrasion testing machine (product name: "DIN Abrasion Testing Machine GT-7012-D"; manufactured by GOTECH TESTING MACHINES Inc.).

In this DIN abrasion testing machine, the test is carried out as following: a drum with a diameter of 150 mm and a width of 460 mm having a #60 polishing paper rolled on the surface thereof is rotated at the rate of 0.32 m/sec, and a sample for the abrasion testing is pressed onto this polishing paper of the drum with a load of 10 N so as to be frictionally worn. Upon testing, in order to smooth the wearing surface, firstly, the sample for the abrasion testing was subjected to a preliminary friction. The preliminary friction was conducted by pressing the sample or the abrasion testing to the drum for 20 m in the atmosphere of 23° C. Then, after the sample for the abrasion testing after this preliminary friction was weighed, the main test was conducted. In the main test, the sample after the preliminary friction was pressed to the drum for 40 m, and then, the weight thereof was measured. The weight difference before and after the main test was obtained (this difference is referred to as abrasion weight). Meanwhile, in order to invalidate the effect of the wearing state of the polishing paper, the abrasion weight of a standard rubber was measured in the same procedure as the above.

Here, the abrasion volume (abrasion loss) A (mm³) can be obtained from the following equation, wherein $W_1$ represents the abrasion weight of the standard rubber, $W_2$ represents the abrasion weight of the sample for the abrasion testing, and S represents the specific gravity of the sample for the abrasion testing. The abrasion resistance is higher when the value of the abrasion loss is smaller.

$$A = (W_2 \times 200)/(W_1 \times S)$$

(3) Measurements of Tensile Strength at Break and Tensile Elongation at Break

The thermoplastic elastomer composition in the form of pellets was injection molded similarly to that for the abrasion resistance evaluation to obtain a sheet; and then, a test piece having a dumbbell-5 shape in conformity with JIS K6251 was punched out from this sheet. The test piece thus obtained was subjected to the tensile test under the conditions with the temperature of 23° C., the pulling rate of 500 mm/min, and the chuck-chuck distance of 5 cm to measure the tensile strength at break (MPa) and the tensile elongation at break (%).

TABLE 2

| | Component | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| (I) | Addition-polymerized block copolymer (I)-1 | 100 | 100 | 100 | 100 | 100 | 100 | 100 | 100 | 100 | 100 | |
| | Addition-polymerized block copolymer (1) | | | | | | | | | | | 100 |
| (II) | Olefin-based resin (II) | 35 | 30 | 40 | 30 | 45 | 30 | 30 | 25 | 40 | 30 | 35 |
| (III) | Crosslinking agent (III)-1 | 2 | 1 | 4 | 2 | | 1 | 1 | 1 | 1 | 1 | 2 |
| | Crosslinking agent (III)-2 | | | | | 2 | | | | | | |
| (IV) | Crosslinking adjuvant (IV)-1 | 35 | 30 | 20 | 13 | 30 | 0.5 | | | | | 35 |
| | Crosslinking adjuvant (2) | | | | | | | 30 | | | | |
| | Crosslinking adjuvant (3) | | | | | | | | 30 | | | |
| | Crosslinking adjuvant (4) | | | | | | | | | 30 | | |
| | Crosslinking adjuvant (5) | | | | | | | | | | 30 | |
| (V) | Softener for rubber (V)-1 | 120 | | | | | | | | | | 120 |
| | Softener for rubber (V)-2 | | 105 | 100 | 110 | 145 | 105 | 105 | 105 | 105 | 105 | |
| Evaluation result | (1) MFR (g/10 min) | 1.8 | 3.2 | 5.1 | 12 | 25 | 39 | 32 | 1.6 | 2.6 | 45 | 83 |
| | (2) Abrasion loss (mm³) | 10 | 6 | 26 | 48 | 62 | 107 | 101 | 162 | 223 | 123 | 246 |
| | (3) Tensile strength at break (MPa) | 14.2 | 15.0 | 11.8 | 10.5 | 10.1 | 9.9 | 9.8 | 8.8 | 4.2 | 8.8 | 8.3 |
| | Tensile elongation at break (%) | 650 | 690 | 700 | 560 | 630 | 560 | 570 | 510 | 210 | 510 | 470 |

From Table 2, it can be seen that the thermoplastic elastomer composition of the present invention is excellent in both mechanical characteristics and abrasion resistance.

On the other hand, in Comparative Example 1 in which the content of the crosslinking adjuvant (IV)-1 was less than 1 part by mass, the abrasion resistance decreased drastically. In Comparative Examples 2 to 5, too, in which the crosslinking adjuvants other than those stipulated in the present invention were used, the abrasion resistance decreased drastically, and also leading to unsatisfactory result in mechanical characteristics. In Comparative Example 6 in which the addition-polymerized block copolymer (1) not having the structural unit (a) derived from a styrene having an alkyl group having 1 to 8 carbon atoms bonded to the benzene ring thereof was used, both the abrasion resistance and the mechanical characteristics decreased drastically.

INDUSTRIAL APPLICABILITY

The thermoplastic elastomer composition of the present invention can be effectively used in a wide range of applications such as, for example, automobile interior and exterior parts such as instrument panels, rack-and-pinion boots, suspension boots, constant velocity joint boots, bumpers, side moldings, weather strips, mud guards, emblems, leather seats, floor mats, arm rests, air bag covers, steering wheel covers, belt line moldings, flash mounts, gears, and knobs; hoses, and tubes such as pressure hoses, fire hoses, hoses for coating, washing machine hoses, fuel tubes, oil hydraulic and pneumatic tubes, and tubes for dialysis; gripping materials for various products (for example, scissors, drivers, toothbrushes, pens, and cameras); home-appliance parts such as refrigerator gaskets, vacuum cleaner bumpers, cellular phone protection films, and waterproof bodies; business machine parts such as feeding rollers and winding rollers for copy machines; furniture such as sofa and chair sheets; parts such as switch covers, casters, stoppers, and leg rubber; construction materials such as coated steel plates and coated plywood; sporting goods such as swimming goggles, snorkels, ski sticks, ski boots, snowboard boots, ski or snowboard surface materials, golf ball covers, various shoes, and outer soles of shoes; medical supplies such as syringe gaskets and rolling tubes; industrial materials such as conveyer belts, electric belts, and pelletizer rolls; stretchable members of sanitary goods such as paper diapers, poultices, and bandages; band applications such as hair bands, wrist bands, watch bands, and eyeglass bands; and other goods swill as snow chains, wire coating materials, trays, films, sheets, stationery, toys, and sundry goods.

The invention claimed is:

1. A thermoplastic elastomer composition, wherein the said composition is obtained by heat-treating a mixture under a molten condition thereof, the mixture comprising:
   100 parts by mass of at least one addition-polymerized block copolymer (I) selected from a group consisting of a block copolymer and a hydrogenated product thereof; the block copolymer comprises a polymer block A mainly comprising a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly comprising a structural unit derived from a conjugated diene compound,
   10 parts by mass to 300 parts by mass of an olefin-based resin (II),
   0.01 parts by mass to 20 parts by mass of a crosslinking agent (III),
   1 part by mass to 50 parts by mass of a crosslinking adjuvant (IV) comprising one methacryloyl group, one acryloyl group, and one or more hydroxyl group, and
   30 parts by mass to 250 parts by mass of a softener for rubber (V).

2. The thermoplastic elastomer composition according to claim 1, wherein the crosslinking adjuvant (IV) comprises an alkylene group having 3 to 12 carbon atoms.

3. The thermoplastic elastomer composition according to claim 1, wherein the crosslinking adjuvant (IV) comprises an alkylene group having 3 to 12 carbon atoms and containing at least one hydroxyl group between the methacryloyl group and the acryloyl group.

4. The thermoplastic elastomer composition according to claim 1, wherein the crosslinking adjuvant (IV) is 2-hydroxy-3-acryloyloxypropyl ethacrylate.

5. The thermoplastic elastomer composition according to claim 1, wherein the structural unit (a) is a structural unit derived from p-methylstyrene.

6. A molded article comprising the thermoplastic elastomer composition according to claim 1.

* * * * *